United States Patent [19]

Anderson

[11] 4,438,757
[45] Mar. 27, 1984

[54] DEVICE FOR REOPENING AN ICE-BOUND WATER SOURCE

[76] Inventor: Lyle C. Anderson, Rte. #6, Fergus Falls, Minn. 56537

[21] Appl. No.: 292,625

[22] Filed: Aug. 13, 1981

[51] Int. Cl.³ ............................................. F24H 1/20
[52] U.S. Cl. ................................. 126/360 R; 249/79; 138/32; 126/343.5 R; 43/4
[58] Field of Search .............. 126/360 R, 343.5 R, 126/367; 405/61; 138/32, 28, 35; 249/79; 43/4; 165/155; 432/224, 225; 114/121, 123, 125

[56] References Cited

U.S. PATENT DOCUMENTS

| | | | |
|---|---|---|---|
| 536,354 | 3/1895 | Kohl | 165/155 |
| 553,110 | 1/1896 | Detwiler | 165/155 |
| 862,593 | 8/1907 | Steiner | 138/32 |
| 1,143,185 | 6/1915 | Grant | 62/307 |
| 1,294,888 | 2/1919 | Farrell et al. | 138/32 |
| 1,488,067 | 3/1924 | Schneider | 114/125 |
| 2,315,634 | 4/1943 | McCall | 249/79 |
| 2,541,328 | 2/1951 | Boklep | 126/350 R |
| 2,747,569 | 5/1956 | Holm, et al. | 423/183 |
| 2,799,146 | 7/1957 | Meagher | 138/41 |
| 2,838,196 | 6/1958 | Chapman | 401/78 |
| 2,914,926 | 12/1959 | Meagher | 138/156 |
| 3,056,272 | 10/1962 | Eilers | 249/79 |
| 3,059,451 | 10/1962 | Anderson | 249/66 R |

*Primary Examiner*—Samuel Scott
*Assistant Examiner*—Noah Kamen
*Attorney, Agent, or Firm*—Merchant, Gould, Smith, Edell, Welter & Schmidt

[57] ABSTRACT

A device for reopening an ice-bound water source is disclosed. Once a hole is provided in a frozen water source, the tubular member is inserted into the hole where it becomes frozen in place. The ice block which will form in the interior region (28) of the tubular member can be ejected. The tubular member itself is heated by a fluid circulating and heating means (62) which runs heated fluid between the walls (20 and 22) of tubular member (12). The heated fluid allows for release of the ice block and dislodgment of the entire unit from the frozen surface of the water supply.

7 Claims, 7 Drawing Figures

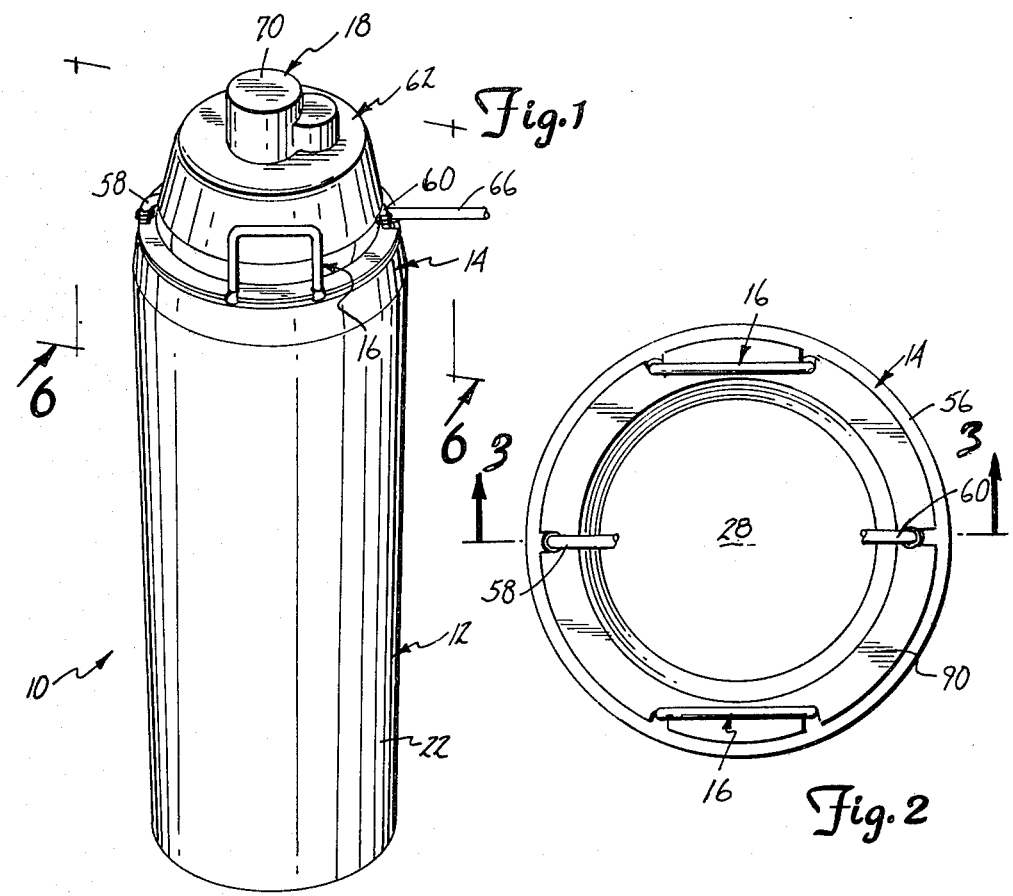
Fig.1
Fig.2
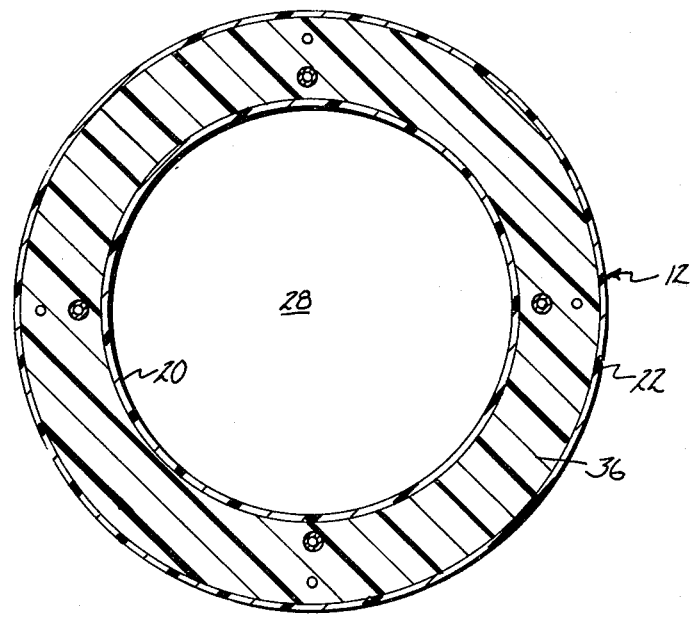
Fig.4

DEVICE FOR REOPENING AN ICE-BOUND WATER SOURCE

TECHNICAL FIELD

The invention relates to devices used for obtaining access to an ice-bound water source. In particular, this device permits the extraction of an ice block which will form in the access due to the refreezing.

BACKGROUND OF THE INVENTION

In regions where the air temperature remains below freezing for substantial periods of time, it is difficult to maintain free access to a water source which is frozen on its surface. In particular, in the practice of ice fishing, it is common for a fisherman to bore a hole in the frozen lake surface in the beginning of the fishing season and return to that same boring throughout the course of the winter. Since it is essentially impossible to prevent the access hole from refreezing without the constant application of energy, a new hole must be bored through the ice frequently.

As an alternative to boring new holes, means may be provided for reopening the access hole by removing the ice plug which forms therein. In my U.S. Pat. No. 3,059,451, I describe a device for removing the ice block which forms in the access hole. Other such devices such as that shown in the Meagher U.S. Pat. No. 2,799,146, provide solutions to this problem.

Although many of these prior art devices satisfactorily reopen the access hole, the device itself often becomes firmly frozen into place and cannot be removed without damage thereto. Furthermore, many of these devices are either heavier than water and therefore may sink to the bottom of the lake, or much lighter than water and will not stay positioned partially immersed in the body of water.

The present invention provides solutions to problems encountered in the prior art devices by providing means for removing the device after use and, in one embodiment, by adjustment of the buoyancy so as to make positioning of the device easy.

SUMMARY OF THE INVENTION

The present invention is directed to a device for reopening an ice-bound water source comprising a double-walled tubular member having open top and bottom ends, means extending between the double walls from the top towards the bottom end for carrying fluids between the walls, and at least one opening in the top end between the walls for permitting the passage of fluids into and out of the tubular element so that fluids can circulate within the tubular member and the member may be freed from surrounding ice and thereafter removed therefrom leaving an opening in the ice.

According to a further aspect of the invention, means are also provided for supplying a flow of heated fluid into the carrying means and withdrawing the fluid out of the opening so as to assist in freeing the tubular member from surrounding ice.

According to a further aspect of the invention, the carrying means is located proximate the inner wall of the tubular member so that the warmest fluid will first be released toward the bottom of the device and against the outer wall.

There have been outlined rather broadly the more important features of the invention in order that the detailed description that follows may be better understood and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for designing other structures for carrying out the several purposes of the invention. It is important, therefore, that the claims be regarded as including such equivalent structures as do not depart from the spirit and scope of the invention.

BRIEF DESCRIPTION OF THE DRAWINGS

In the drawings, wherein like reference numerals refer to like elements throughout the several views, FIG. 1 is a perspective view of the preferred embodiment of the present invention;

FIG. 2 is a top plan view of the preferred embodiment with portions removed;

FIG. 4 is a view taken generally along line 4—4 of FIG. 3;

DETAILED DESCRIPTION OF THE PREFERRED EMBODIMENT

Figure 3:
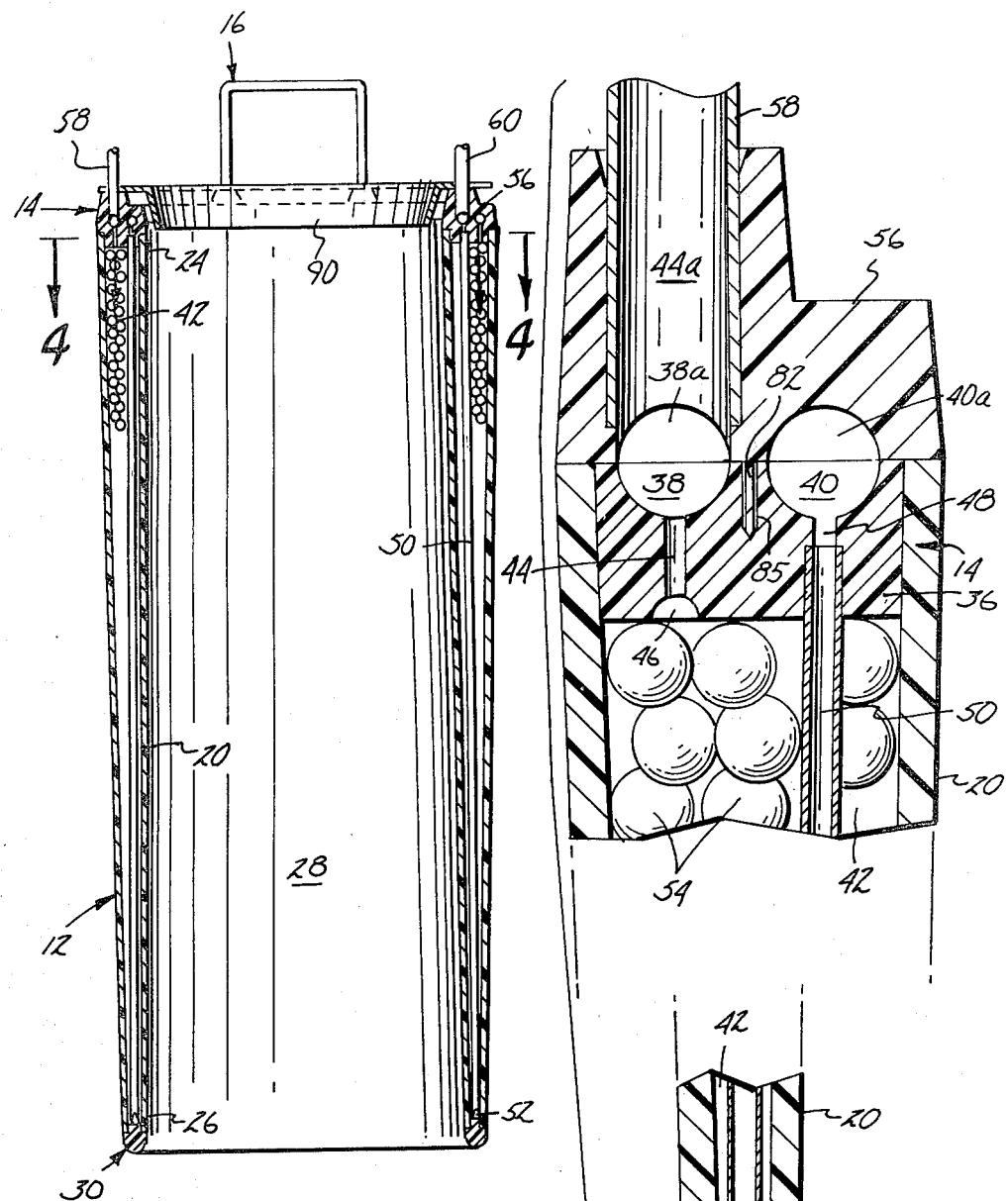
FIG. 3 is a cross-sectional view taken along line 3—3 of FIG. 2 of the preferred embodiment.

Referring to the drawings in detail, there is shown in FIG. 1 a preferred embodiment of the water source reopening device 10 having a tubular member 12, a manifold element 14, handles 16 and heating and circulating means 18.

From FIG. 2 and FIG. 4, there can be seen the inner wall 20 and the outer wall 22 of the tubular member 12. Tubular member 12 has an open top end 24 and an open bottom end 26. In the preferred embodiment, the diameter of inner wall 20 increases from the top to the bottom end. The diameter of the outer wall 22 decreases from the top to the bottom end. This arrangement permits an ice block which may be formed in the hollow space 28 to be ejected from the tubular member 12 by simply forcing it downward into the water source. The increasing diameter of the outer wall 22 prevents the tubular member 12 from being carried down with the ice block during this procedure.

Figure 5:
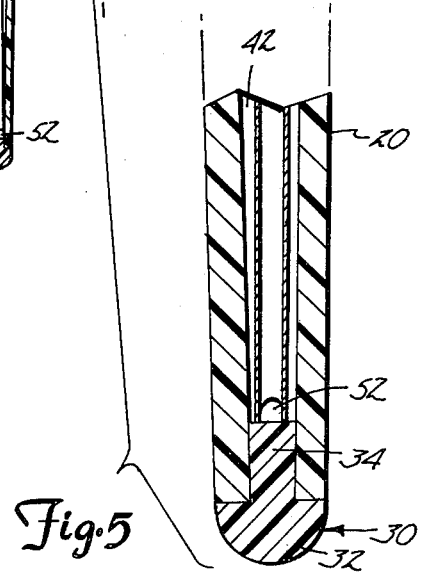
FIG. 5 is an enlarged detailed sectional view of a portion of the tubular member shown in FIG. 3.

The inner and outer walls 20 and 22 of tubular member 12 are preferably sealed by ring 30 shown in cross-section in FIGS. 3 and 5. Ring 30 includes a bottom portion 32 and a member 34 extending orthogonally therefrom and into the space between the walls.

At the top end of the tubular member, there is found a fluid impervious pressure barrier seal 36 which seals the top end of walls 20 and 22. Barrier 36 also functions as part of a manifold element 14 in that it has two concentric circular depressed regions 38 and 40, and at various points around the perimeter of the barrier, a passage is formed through the barrier to permit communication with the space 42 defined by members 34 and 36 and walls 20 and 22. In the preferred embodiment, the outer passage 44 is an inlet aperture and has a free end opening into space 42 and a circular depression 46 similar to region 38 running the perimeter of barrier 36. Out passage for tube 48 is located proximate the innermost wall 20. Connected to passage 48 is tube 50, which extends therefrom toward the bottom end of tubular member 12. In the preferred embodiment, tube 50 extends to element 34 and has an aperture 52 cut therein.

In the preferred embodiment, there will be four apertures 44 and four apertures 48 equally spaced around the circumference of barrier 36, as can be seen in the cross-sectional view of FIG. 4.

In the preferred embodiment, the space 42 in tubular member 12 may be partially filled with air cells 54, which are solid (are) non-liquid encapsulated spheres or elements having a density of less than 1 (i.e., water). The cells perform two functions. First, they act to take up some of the free space in region 42 so as to diminish the amount of fluid which need be circulated therein, and secondly, they permit the overall density of the device to be adjusted such that it is only slightly buoyant. This will permit the major portion of the tubular member to be maintained below the water line without the need for considerable force to hold it in place until frozen in. In addition, a density of less than water will permit the device to float rather than sink to the bottom of the lake where it might be lost. The air cells may be of any suitable material which will not be damaged by the chemical formulation nor the temperature of the fluid circulated therein.

Affixed atop barrier 36 and attached thereto along with the upper ends of walls 20 and 22 is cap member 56, which includes two concentric circular depressions 38a and 40a which mate with depressions 38 and 40 in barrier 36. When these depressions are joined as shown in FIG. 5, they create a fluid tight concentric passaways in the form of a manifold which puts all passages 44 in fluid communication with each other as well as doing the same with passages 48. Top member 56 includes one passage 44a defined by an elongated neck which is lined by a tubular member 58 (seen in FIGS. 2 and 5), and a second inlet passage 45a (seen in FIG. 6) likewise defined by an elongated neck connecting to passage 48 and being lined with tubular member 60. Members 58 and 60 are held releasably engaged within member 56 by compressive forces of the material so that the circulating means 18 is removable.

Tube 58, therefore, is in fluid communication with all passages 44 by means of the manifold effect of the regions 38, 38a, 40, and 40a in barrier 36 and top member 56. Likewise, tubular member 60 is in fluid communication with passages 48.

In the preferred embodiment, means are provided for heating and circulating fluids into tube 58 and out of tube 60. Alternatively, fluid may be circulated in the opposite direction.

To ensure that element 56 becomes properly aligned with barrier 36 during assembly, barrier 36 is designed with an alignment aperture 85 to receive alignment pin 82 extending from element 56. A plurality of these alignment devices are preferably located around the circumference of these members so as to ensure proper alignment.

Figure 6:
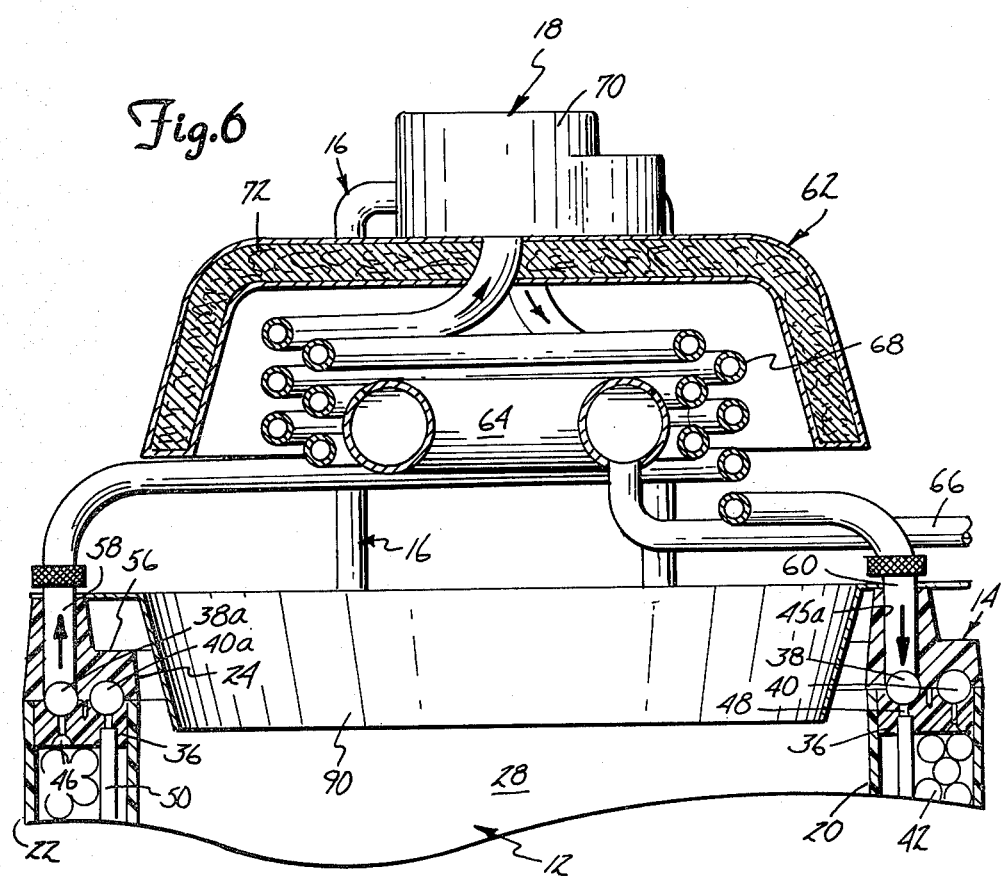
FIG. 6 is a view taken generally along line 6—6 of FIG. 1 and shown in fragmentary section.

FIG. 6 illustrates a preferred heating and pumping unit 62 having a gas burner 64 which is supplied with combustible gas by pipe 66. Alternatively, electric or other heating means may be used. Circulation of fluids is made through a helical coil of tubular material 68 which connects tubes 58 and 60. The coil 68 is located proximate burner 64 so as to absorb heat therefrom.

To circulate the fluid in coil 68 and thus throughout the system, a pump 70 is included within the circulation system and is placed atop the metal heat shield 72 which forms the upper housing of heating and pumping means 62. Pump 70 may be electrically or mechanically driven as desired.

As shown in FIGS. 1 and 2, tubular member 12 is provided with handles 16 and 18 for removal of the entire device.

Figure 7:
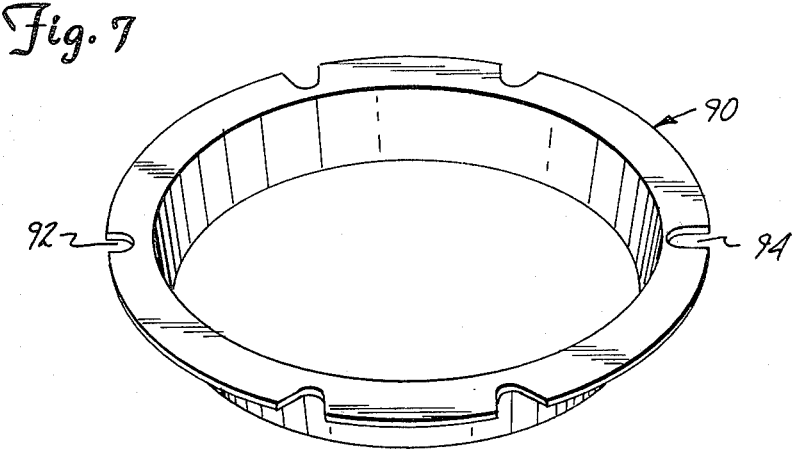
FIG. 7 is a perspective view of a cover plate forming part of the preferred embodiment.

Placed atop member 56 is protective shroud 90, shown in FIGS. 6 and 7, which is preferably made of metal and has notches 92 and 94 for receiving tubes 58 and 60 which must pass therethrough. Shroud 90 provides protection of the softer parts of the tubular member.

OPERATION

A suitably sized hole must first be made in the ice to gain access to the fluid source. Typically, in the case of ice fishing, an auger or chisel may be used. The main body of tubular member 12 is then inserted into this hole such that only a small portion of the device extends above the ice surface. The tubular member may be made in any length depending on the climate in which it is used, i.e., the colder the climate, the longer the member should be. The system is preferably charged with fluid such as antifreeze, and the entire device 10 should have a slight buoyancy. If the system is charged with hot air, it will be necessary to provide a counterweight at the lower end of the tubular member so that the device will remain under water. It is possible to gain access to the water supply (for fishing or the like) through space 28, in which case heating and pumping means must be removed; however, it may be preferable to remove the entire device for access and reinserting it after use.

Initially, the device is used without activating heating and pumping means 62 since it is only used during the process of removing the tubular member from the ice surface or for removing an ice block in the region 28. The device is inserted into the opening in the ice where it will eventually freeze in place. The water will naturally rise upward within the open space 28 of the tubular member to the level of water within the lake. Eventually, this water will freeze, closing the access. If access through space 28 is desired and the ice block has become solidly adhered to the inner surface of wall 20, it is possible to use the heating and pumping means to melt the points of adhesion as will be explained hereinafter.

When the user wishes to remove the device entirely from the water supply, it is necessary that heating and pumping means 62 be affixed to the tubular member. Heated fluid will circulate through coil 68 into tube 58 and downward through tube 50 to the bottom end of the tubular member, where the fluid will escape through a port 52. This heated fluid will then travel upward mostly along the outer wall 22 of the tubular member, where it will transfer heat to the ice adjacent that wall.

It is preferable to circulate the warmest fluid first against the outside wall 22 where it will have the maximum melting effect. In the preferred embodiment, the hottest water is carried to the bottom of the tubular member by tube 50 whereafter it will rise toward the top end primarily along the outer wall.

If the ice block which forms within region 28 is not removable by merely applying a downward force, which is often the case, the heating means may be used to cause the inner wall 20 of tubular member 12 to melt the ice while simultaneously expanding in diameter, thereby freeing up the ice block.

Once the device is removed, the ice block which has formed in space 28 will likely remain floating in the access hole. It may then be removed because, with the device removed, the access is of sufficient diameter. To assist in removal a handle 15 and support 14 as shown in my U.S. Pat. No. 3,059,451, which is hereby incorporated by reference, may be employed. The handle will freeze into the block and assist in its removal.

In the preferred embodiment, it is expected that the walls of the tubular member will be made of a plastic material while barrier 36 and top member 56 would preferably be made of similar material or of a hard rubber material. The two sections may also be fused together.

Numerous characteristics and advantages of the invention have been set forth in the foregoing description, together with details of the structure and function of the invention. The disclosure, however, is illustrative only, and changes may be made in detail, especially in matters of shape, size, and arrangement of parts, within the principle of the invention, to the full extent of the broad general meaning of the terms in which the appended claims are expressed.

What I claim is:

1. A device for reopening an ice-bound water source, comprising:
   (a) a double-walled hollow tubular member having open top and bottom ends defining a space between the walls;
   (b) at least one tube extending between said double walls from said top and toward said bottom end for carrying fluid between said walls;
   (c) a first fluid impervious barrier between said walls at the top thereof, said barrier including upper and lower surfaces first and second concentric depressions on its top surface, said first depression including at least one inlet aperture sized to receive the upper end of said at least one tube, said second depression including at least one outlet passage providing fluid communication through the upper and lower surfaces of said barrier; and
   (d) cover means located atop said barrier and in fluid tight connection therewith for covering said depressions to create fluid tight concentric passageways, said cover means including an inlet in fluid communication with said first depression and an outlet in fluid communication with said second depression, whereby warmed fluid can be circulated from the inlet to the outlet and thereby transfer heat to the tubular member.

2. The device of claim 1 wherein said tube is located adjacent the innermost wall of the tubular member.

3. A device according to claim 2 wherein said cover means has a bottom surface and said bottom surface includes a pair of concentric depressions sized to mate with said depressions in said barrier, thereby forming a manifold to provide fluid connection from the inlet and outlet of the cover means through said tubular member.

4. A device according to claim 2 or 3 wherein said at least one aperture includes a plurality of apertures spaced around said barrier.

5. A device according to claim 3 wherein said cover means includes a pair of elongated neck members extending from said inlet and outlets and having apertures therein and including a pump and heater having conduits sized to releasably engage said neck members to provide a removeable supply of heated fluid to said tubular member.

6. The device of claim 5 wherein said space is at least partially filled with solid elements so that said fluid therewithin will be partially displaced whereby the buoyance of said tubular member may be adjusted by addition or removal of said space filling means.

7. The device of claim 6 wherein said device has an overall density slightly less than water so that it is slightly buoyant.

* * * * *